Patented June 21, 1949

2,473,747

UNITED STATES PATENT OFFICE 2,473,747

ART OF PRESERVING AND MAINTAINING COLOR OF GREEN VEGETABLES

Leonard F. Gieseker, Preble, Ind.

No Drawing. Application April 19, 1948,
Serial No. 21,859

8 Claims. (Cl. 99—186)

It has long been known that the color of green vegetables can be maintained during heat treatment if sufficient alkali is added to maintain a pH of 7 or above. The main difficulty is to find an alkali which does not affect the texture and flavor of the green vegetables and is definitely non-toxic. The sodium compounds, (for example, sodium hydroxide, sodium carbonate, and sodium bicarbonate) when used for this purpose, cause an undesirable softening of the product. The calcium compounds (for example, calcium hydroxide or calcium oxide) cause an undesirable toughening of the tissues. Magnesium (for example magnesium hydroxide or magnesium oxide) does not have any noticeable undesirable effect on the food-stuffs but these compounds are not sufficiently soluble to complete the process by themselves. Also, magnesium used in the brine is objectionable on a commercial basis, as there is a possibility for the development of struvite, which forms as hard white crystals of magnesium phosphate.

It is therefore the object of this invention to use only a single treatment and to employ as the alkalizing agent a sufficient quantity of a diluted solution of ammonium hydroxide so that the pH of the processed food-stuff is maintained at 7 or slightly above and will retain practically all of the original texture, flavor and color of the raw product.

I have found the green color of peas may be preserved by giving them a hot water wash as is customary in the present commercial canning of peas, then soaking them at substantially room temperature for from 2 to 10 minutes in a solution of .1 normal ammonium hydroxide solution. The peas are then rinsed with water, packed into cans with brine added. The pH after processing should be between 7 and 8, preferably 7.3 to 7.5. The maturity, size, and variety of the pea will determine the length of time necessary to soak the peas to obtain a pH in the proper range in the final product.

It is not necessary to use a solution of .1 normal ammonium hydroxide for this process. If a stronger solution of ammonium hydroxide were used, the length of time of the soak can be reduced. Similarly a longer time would be necessary if a more dilute solution of ammonium hydroxide is used.

It is notable that in this process the only treatment required is the described treatment with a dilute solution of ammonium hydroxide to maintain the pH at 7 or slightly above and also retain the color of the foodstuffs. No further alkaline treatment is necessary, nor is it necessary to add an alkaline tablet to the brine or to use brine containing a soluble alkaline material.

Ammonium hydroxide solution has a greater wetting and penetrating rate than an equivalent solution of the alkaline carbonates or bicarbonates. Therefore the length of time necessary to accomplish the desired change in pH of the foodstuffs is considerably reduced in the use of ammonium hydroxide as compared with any of the alkaline carbonates or bicarbonates. Sodium hydroxide is not suitable to use by itself to accomplish the pH change because the product will become soft and mushy. It is not necessary when using the ammonium hydroxide to add any foreign wetting agent.

An example of this process is as follows:

4 sieve size Pride peas were cleaned and washed in the customary manner. They were given a hot water wash for 7 minutes at 200 degrees F. They were then cooled with water to room temperature and soaked in .1 normal ammonium hydroxide solution for 5 minutes. After soaking, the peas had a pH of 8.2. They were then rinsed with water, packed with brine containing sugar and salt into 307 x 409 cans ($3\frac{3}{16}$ inches in diameter, $4^{7}/_{19}$ inches tall) and processed for 8 minutes at 260 degrees F. After processing the peas were rapidly cooled and held in storage at a temperature below 60 degrees F. (not essential but desirable) to hold the color as long as possible. After one day's storage the pH of the peas was 7.5. The color of the peas was substantially identical with the color of the same peas when harvested. The texture and flavor of the peas more nearly resembled the flavor and texture of the fresh pea than the peas from the same lot canned without the ammonium hydroxide treatment.

While I have referred only to peas in the specific example above given, it will be understood that the invention is of general application to all green vegetables. The most common application is to peas but the invention is also applicable to beans, spinach, and any other green vegetable which is to be canned.

I claim:

1. A method of preserving the color of canned green vegetables which method consists in soaking the vegetables in a dilute solution of ammonium hydroxide prior to canning.

2. The method recited in claim 1 in which the soaking operation continues in a sufficient concentration of ammonium hydroxide and for a sufficient period to raise the pH to a range between 7 and 8.

3. The method of preserving and maintaining the color of canned green vegetables which comprises the preliminary treatment of the vegetables prior to canning by washing the vegetables with hot water and then soaking them for from two to ten minutes in a dilute solution of ammonium hydroxide and thereafter rinsing and packing for canning.

4. The method recited in claim 3 in which the pH of the vegetables is raised in consequence of the soaking operation to a range between 7 and 8.

5. The method recited in claim 3 in which the pH of the vegetables is raised in consequence of the soaking operation to a range between 7.3 and 7.5.

6. The method recited in claim 3 in which the solution in which the vegetables are soaked has a concentration of approximately .1 normal and the vegetables are soaked therein sufficiently long to raise the pH of the vegetables to an ultimate value between 7 and 8.

7. The method herein described comprising blanching the green vegetables with a hot water wash and subsequently soaking the vegetables in dilute ammonium hydroxide solution until the pH of the vegetables is raised to an ultimate value between 7 and 8 and thereafter rinsing the vegetables, canning them in flavored brine and rapidly cooling the canned vegetables.

8. The method recited in claim 7 in which the ammonium hydroxide solution has a concentration of approximately .1 normal and the time of soaking there is from two to ten minutes and the pH is raised to a range between 7.3 and 7.5.

LEONARD F. GIESEKER.

REFERENCES CITED

The following references are of record in the file of this patent:

UNITED STATES PATENTS

| Number | Name | Date |
|---|---|---|
| 2,189,774 | Blair | Feb. 13, 1940 |
| 2,305,643 | Stevenson et al. | Dec. 22, 1942 |
| 2,390,468 | Schroder et al. | Dec. 4, 1945 |